Jan. 16, 1951     E. M. ANDERSON ET AL     2,538,492
PORTABLE GAS BURNING SPACE HEATING UNIT

Filed July 25, 1946     3 Sheets-Sheet 3

INVENTOR.
Ernie Martin Anderson
George R. Kelley
Earle A. Clifford
BY
ATTORNEY

Patented Jan. 16, 1951

2,538,492

UNITED STATES PATENT OFFICE 2,538,492

PORTABLE GAS BURNING SPACE HEATING UNIT

Eric Martin Anderson, Westbrook, George R. Kelley, Portland, and Earle A. Clifford, Gorham, Maine, assignors to Utilities Distributors, Inc., a corporation of Maine Application July 25, 1946, Serial No. 686,210

14 Claims. (Cl. 126—93)

The present invention relates to improvements in heaters, and more particularly to a portable space heating unit suitable for drying out and preheating freight cars, trucks, interiors of buildings under construction and the like.

The heating unit herein disclosed as embodying in a preferred form the several features of the invention, is of a general type which utilizes a liquefied petroleum gas such as propane as the fuel, and consists generally of a storage chamber for liquefied gas which may be provided in bottled form, a distributing system through which the gas is drawn off from the bottles, and a burner which is suitably constructed and enclosed to provide for the rapid and efficient dissemination of heat therefrom. Although a liquefied petroleum gas such as propane, because of its great efficiency and high B. t. u. rating, would appear to be an ideal fuel for this use, considerable difficulty has been encountered heretofore in producing a heating unit within which it is possible to draw off gas in sufficient quantity from a relatively small storage unit to produce the required heating effect, particularly under adverse conditions of extreme cold. The highly volatile and inflammable nature of the fuel employed has presented a serious additional problem of safety both in the handling and in the operation of the unit.

It is a principal object of the invention to provide a novel and improved portable space heater having a high capacity burner and a relatively small reserve supply of fuel from which gas is drawn off to the burner, which is well adapted to deliver a great deal of heat for a limited period.

It is a further object of the invention to provide a portable space heater of this general type with a high capacity heating unit which is so constructed and arranged as to substantially eliminate any risk of uncontrolled fire or explosion.

It is a further object of the invention to provide a novel construction and arrangement of the heating unit which is well adapted for supplying heat in controlled quantities to the fuel storage chamber and fuel containers to maintain the temperature around the fuel containers within a predetermined range high enough for efficient evaporation and rapid supply of gas from the containers, but without increasing the pressure of evaporation within the containers and supply lines beyond the limits of safe operation.

Figure 1:
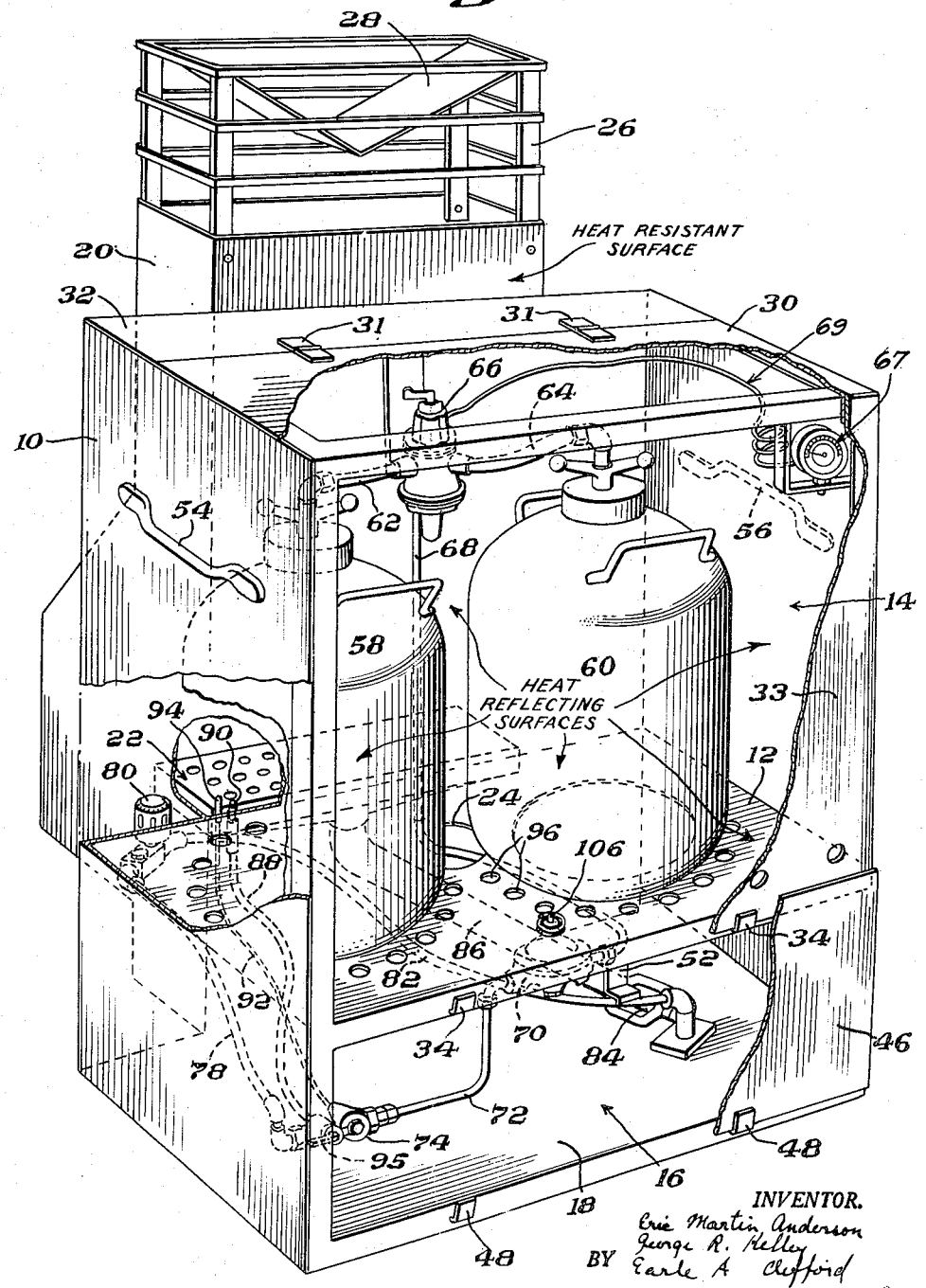
Figure 2:
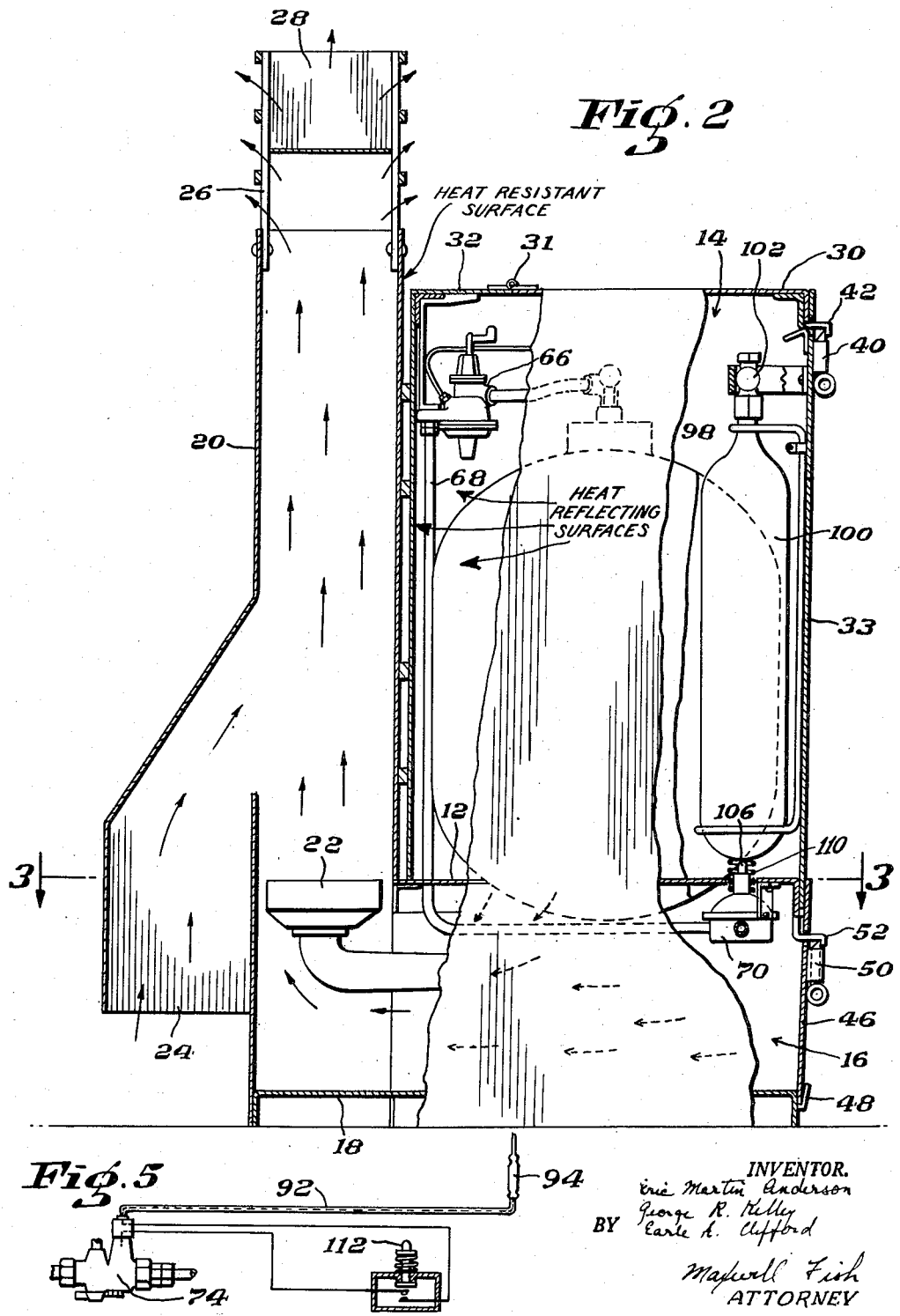
Figure 3:
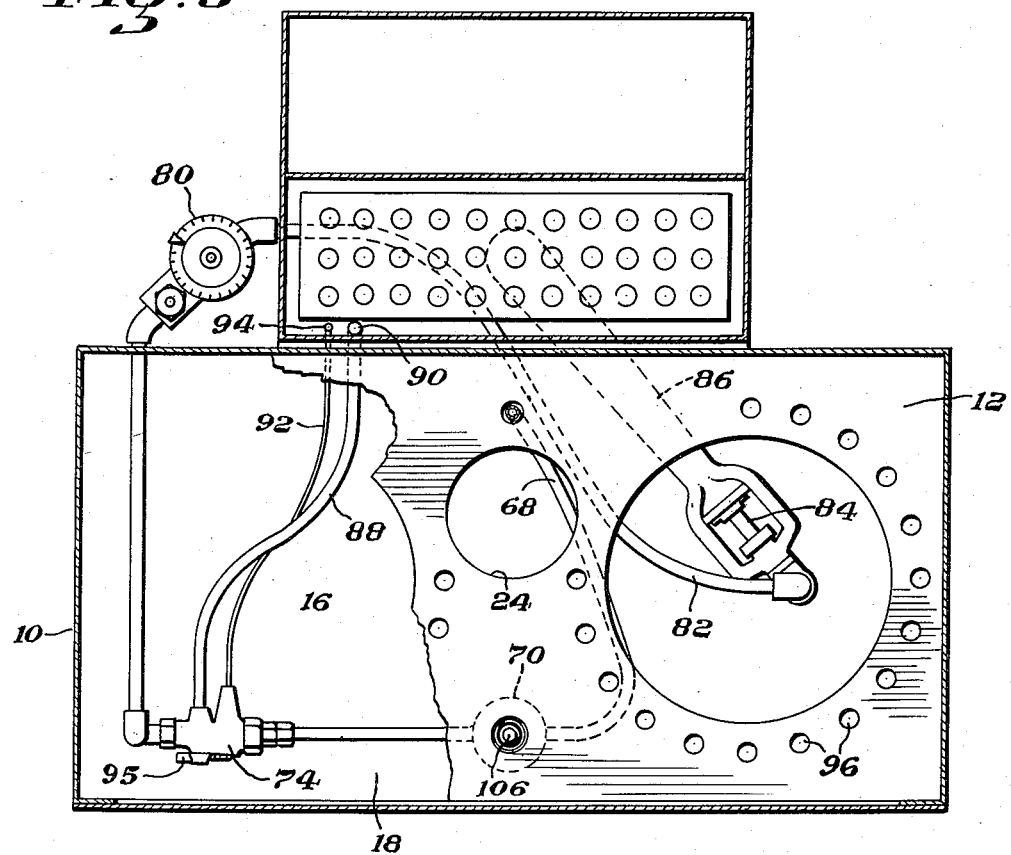
Figure 4:
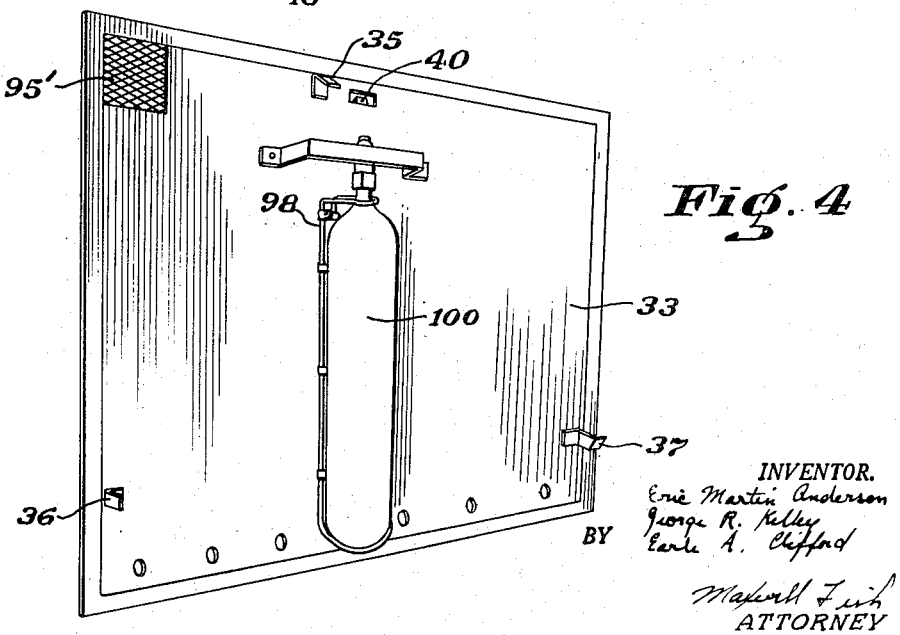

With these and other objects in view, the several features of the invention consist in the construction and arrangement of the heating unit hereinafter described, which together with the advantages to be described, will be readily understood from the following description taken in connection with the accompanying drawings, in which Fig. 1 is a perspective view of applicants' improved portable heating unit, portions of the casing being broken away to illustrate underlying parts; Fig. 2 is a view in left side elevation of the heating unit shown in Fig. 1, with the stack and portions of the fuel storage housing broken away to show underlying parts; Fig. 3 is a sectional plan view taken on the line 3—3 of Fig. 2, but with a portion of the floor of the fuel chamber broken away to show underlying parts; Fig. 4 is a perspective view of the door to the fuel storage chamber looking from the inside of the door; and Fig. 5 is a diagrammatic view of an alternative form of automatic safety fuel shut-off.

Referring specifically to the drawings, the portable heating unit herein disclosed as embodying in a preferred form the several features of the invention, comprises a rectangular casing 10 having a horizontal partition 12 which forms the floor for a fuel storage chamber 14 and closes off a chamber 16 therebeneath in the base of the unit. A second horizontal partition 18 at the base of the unit provides a floor for the base chamber 16. The unit is also provided at its rear side with a vertically extending rectangular stack 20 which is directly connected at its lower end with a rearward extension of the base chamber 16, and is spaced from that part of the casing 10 forming the fuel storage chamber 14 by an air space which may be in the order of one-half inch to one inch in width. The burner for the unit generally indicated at 22 is mounted in the lower portion of the stack 20 at substantially the level of the horizontal floor partition 12 between the base and fuel storage chambers 16, 14 above referred to. The stack 20 is formed at its rear side with an air intake flue 24 which has its opening about six to eight inches from the floor level, and enters the stack substantially above the level of the burner 22. The stack is provided at its upper end with a cage 26 within which is mounted a baffle plate 28 which serves to deflect laterally the hot gases passing upwardly through the stack from the burner 22.

In order to provide access to the base and storage chambers, a series of removable covers are provided which include a removable top cover plate 30 which is mounted by means of hinges 31 to a second rigidly mounted plate 32. The fuel storage chamber is enclosed in front by means of a front plate or cover 33 which is hinged at its lower side by means of lugs 34. Detent members 35 mounted on the inside face of the cover 33 adjacent the upper edge, and detent member 36 mounted adjacent the side edges are arranged when the cover is closed to engage against the upper and side edges of the frame opening closed by the cover to secure the cover firmly in place. A catch member 37 mounted on the inner face of the cover 33 acts when the cover is swung open to catch against the side of the frame opening so that the cover may not inadvertently be allowed to fall to the floor. At its upper end the cover 33 is arranged to be held in place by means of a latching device, comprising a spring latch member 40 mounted on the cover 33 and a catch 42 which is carried on the cover member 30. With this construction and arrangement of the covers and latching device, the covers cannot be locked into position until both covers are in place, so that the operator cannot inadvertently fail to close one or the other of these covers when closing and locking the unit after servicing.

In accordance with the invention, and as hereinafter more fully set forth, the heating unit is so arranged as to prevent the starting of the heater until after the several covers are closed and locked into place. The closing of the covers is vital for the proper operation of the burner which operates efficiently only with a carefully regulated amount of secondary air for combustion. If the covers 30 and 33 are not fully closed, the amount of such air drawn into the burner through the base chamber would be substantially increased with the result that conditions within the burner would become unbalanced. Furthermore, efficient operation of the fire extinguisher contained within the storage chamber as hereinafter more fully set forth, is dependent upon its use within a confined space. Any opening of the covers 30 or 33 would tend both to prevent the early detection of an extraneous fire through increase in temperature within the storage chamber, and would cause the carbon dioxide gas when liberated to spread out and therefore to operate less effectively. For reasons of safety, it has been found essential also to insure that both the burner and the pilot are extinguished while the operator is servicing the heater, and thus to avoid any possibility of fire or explosion which might result from contact of escaping gas with an open flame.

The base chamber 16 is enclosed by means of a cover 46 which is held in place at its lower edge by means of two lugs 48, and at its upper edge by means of a spring latch member 50 on the cover 46 which engages with a catch member 52 on the casing. For convenience of transporting the unit from one place to another, handles 54, 56 are mounted on opposite sides of the casing 10.

The burner 22 is supplied from two fuel gas containers or bottles 58, 60 which are supported on seats provided by circular cut-outs in the transverse floor partition 12. The gas is supplied from the containers through pipes 62, 64 to an automatic control regulator 66 which acts automatically to select the container from which gas is being drawn. An indicator gage 67 connected by a small diameter tube 69 with the automatic control regulator 66 and mounted within the upper right-hand corner of the housing 10 provides a convenient means for ascertaining the amount of the gas pressure in the regulator 66. The gas passes downwardly through a connecting pipe 68 to a diaphragm shut-off valve 70 located in the forward upper portion of the base compartment 16. This valve, as hereinafter more fully pointed out, is particularly intended to provide for an automatic shut-off of the supply of gas until and unless the covers for the unit have been positioned and fastened in place. The gas then passes through a safety-cut-off valve 74 to a thermostat 80, and thence through a conduit 82 to a mixing valve 84. The mixture of gas and air there provided, passes through a pipe 86 to the burner. The safety-cut-off valve 74 has a pipe connection 88 to a pilot burner 90 associated with the burner, and wire connections 92 providing an electrical circuit to a thermocouple 94 located at the burner for controlling the positions of the safety valve 74. A manual control 95 connected with the safety-cut-off 74 provides a convenient means for manually shutting off the burner.

In accordance with the invention, the portable heating unit illustrated is so constructed and arranged as to permit the use of a very large burner which is rated at 50,000 B. t. u. per hour, although burners having a capacity of from 20,000 to 200,000 or even more B. t. u. per hour, may be used, which will nevertheless operate with entire safety, and which is further so constructed and arranged as to enable an adequate supply of gas to be drawn off from the two supply bottles 58, 60 illustrated, at the extremely rapid rate necessary for the supply of such a burner. In this connection, it may be noted that the portable unit illustrated is intended for use under extreme conditions where the temperature of the space to be heated at the beginning of the heating and drying operation may be well below zero, and in which the conditions are therefore not favorable for the rapid evaporation of the gas from the bottles 58 and 60. On the other hand, during the operation of drying out and preheating a freight car, truck body or the like, as the case may be, a condition may subsequently arise in which difficulty is experienced in controlling the heating unit against the risk of overheating with resulting fire. The propane gas fuel employed condenses into a liquid at approximately —45° F. When the temperature is gradually raised above this level, gas is evaporated from the exposed top surface of the mass within the container under a pressure and at a rate which increases with the rise in temperature. This evaporation of the gas is accomplished by a characteristic loss of heat which has a corresponding cooling effect upon the container. A favorable condition for the rapid evaporation of the gas from the containers and consequent maximum rate of supply of gas to the burner 22 is obtained when the temperature conditions in the storage chamber 14 are stabilized at about 85° F. to 100° F. The temperature of the storage containers cannot be permitted to rise much above the 100° F. limit referred to, because of the accompanying increase of internal pressure which for higher temperatures rapidly exceeds the limits of safety.

With the present construction, the two objects of warming the storage chamber as rapidly as possible to the desired 85° F., and at the same time of controlling the supply of heat in such a manner as to prevent overheating of the storage chamber, are achieved by means of the construction and arrangement of the stack with the heater mounted therein, and of the storage chamber in close proximity to and connected with the stack in a manner to produce an efficiently controlled and balanced circulation of air through and around the heating unit, and a controlled and efficient dissemination of heat to the storage chamber. As best shown in Figs. 1 and 2 of the drawings, the operation of the heater 22 will create a powerful upward draft of hot air in the stack 20. The supply of secondary air necessary for combustion is drawn to the burner through the base chamber 16, and is regulated in amount by the size of the inlet openings. A small amount of the air passing through the chamber 16 is drawn from the storage chamber 14 passing in through a grill 95' in the upper left corner of front cover plate 33, and downwardly through vent holes 96 in the floor plate 12, so that a slight but consistent down draft of air is created in the storage chamber. The air in the stack about the burner 22 tends to be heater greatly in excess of the 500° F. which has been found to be satisfactory as a flue temperature in the stack 20. In order to maintain the required 500° F. maximum, and in order to assist in the circulation of air throughout the space to be heated, additional air is drawn in through the downwardly extending vent 24, this air being mixed with the air in the stack 20 to produce a circulating air flow in large volume and a relatively stable stack temperature which is readily maintained at about 500° F. The baffle plate at the top of the stack is of substantial importance to divert and disseminate the flow of this rising column of heated air which if directed against the roof of the heated space, would certainly cause charring and even burning of the roof of the enclosed carrier space. With the construction and arrangement of the casing 10 and stack 20 above described, the flow of air in and about the heater is such as to insure a proper amount of air for the efficient combustion of gas in the burner, the maintenance of the flue temperature in the stack at a temperature which will not substantially exceed 500° F., for the efficient and safe operation of the heater, and the rapid circulation of air in large volume throughout the space to be heated.

A further feature of the invention is concerned with the maintenance of a most efficient temperature within the fuel storage chamber 14 in and about the storage bottles 58, 60, in order to maintain these bottles at a most efficient temperature for the dissemination or drawing off of gas therefrom, without at the same time creating risk of extraneous fire. The heat of the burner 22 is employed to control the temperature within the fuel storage chamber 14. The means employed to this end, comprises the stack 20 which, as previously noted, is located away from the casing 10 a relatively small distance. In the present case, the distance referred to, which is in the order of one-half inch, acts simultaneously as an insulating device to prevent the transfer of an excessive amount of heat to the storage chamber, and at the same time to permit the transfer of controlled amounts of such heat for the proper heating of the fuel storage space. In the present instance, the air space employed between the stack 20 and the casing 10 while providing an insulating barrier of air, is substantially less than would be found desirable except for the necessity of making the unit as compact as possible. In order to reduce to the desired proportions the amount of heat transferred, the outside of the stack toward the casing 10 is painted with a heat resistant paint, which tends to discourage the dissemination of heat from the stack. The adjacent surface of the casing housing the storage chamber is covered with heat reflecting paint such as aluminum paint, which tends further to cut down the dissemination of heat to the fuel chamber. Finally, the entire inner area of the storage chamber and the bottle associated therewith, are painted with a heat reflecting paint which may be aluminum. The object of painting this area of the device with a heat reflecting material is to cause the heat which is transmitted to said chamber to be disseminated in such a manner as to avoid overheating of any part of the bottles. It has been found with this arrangement above described, that the temperature within the fuel storage chamber will rapidly rise to a temperature which is in the order of 85° F. to 100° F., and then tends to become substantially stable within this range.

In accordance with the invention, the burner is located substantially at the level of the lower ends or bases of the fuel containers, for the most efficient dissemination of heat thereto. The transfer of heat from the burner to the containers is direct, and is aided very little if at all by the circulation of heated air. In order to insure that the containers are properly heated particularly as the supply of gas contained therein reaches a low level when the cooling effect of evaporation is greatest, it has been found desirable to locate the burner substantially at the same level with the bottoms of the containers.

In accordance with a feature of the invention, the thermostat 80 serves the dual function of adjusting the operation of the heater to turn down the burner when the temperature in the space being heated reaches a predetermined maximum, and operates further as a safety device to turn down the heater in the event that the stack temperature substantially exceeds 500° F. which has been determined as a maximum safe operating flue temperature. To this end the thermostat is located adjacent the stack at approximately the burner level, but removed therefrom a sufficient distance so that it is effectively insulated from the stack by convection air currents, but sufficiently close to the stack so that any substantial increase of radiant heat given off from the outer surface of the stack in the event that the temperature greatly exceeds 500° F., will cause the thermostat to operate. While the most effective location of the thermostat and the precise distance of location from the stack may be expected to vary with the form of thermostat employed, the condition of the exterior wall of the stack and other allied considerations, in the present instance, experimentation has indicated that best results will be obtained when the thermostat is located as shown in the drawing at or slightly above the level of the burner, and at approximately two to three inches away from the outer surface of the stack.

In accordance with a further feature of the invention, a fire extinguishing unit is provided, so located in the heating unit to operate most efficiently in the event of an extraneous fire to instantly extinguish the burner and at the same time to extinguish any such extraneous flame before it reaches unmanageable proportions. As best shown in Figs. 2 and 4 of the drawings, a bracket 98 is provided on the inner face of the front cover 36 of the fuel storage chamber 14 for the support thereon of a vertically arranged carbon dioxide fire extinguisher 100 which is supported in the bracket 98 in an upright position. The extinguisher 100 is provided with a fusable plug generally indicated at 102 which is adjusted to release the fire extinguishing carbon dioxide gas at a temperature of 135° F. In the event that a fire starts in or beneath the fuel chamber 14, causing the temperature within the chamber to rise to or above this level, the plug 102 will fuse, releasing a large volume of carbon dioxide gas, which instantly fills to overflowing the confined spaces provided by the casing. The gas is carried by the downward current of air above referred to, into the lower portions of the heating unit including the base chamber 16, and to the lower end of the stack 18, with the effect that the burner 22 together with the extraneous fire causing the temperature rise will be instantly smothered.

Further in accordance with the invention, means are provided including the shut-off valve 70 above referred to, for automatically shutting off the supply of fuel to the burner when ever the covers 30, 33 for the fuel storage chamber 14 are removed, as for the servicing or replenishing of the unit. As best shown in Figs. 1, 2 and 3 of the drawings, the shut-off valve 70 is formed with an upwardly extending contact pin 106 which is arranged when the cover 33 is in place to be engaged with and depressed by contact with the under side of the fire extinguisher 100 to open the shut-off valve. Removal of the cover 33 and fire extinguisher 100 therewith, has the effect of allowing the pin 106 to rise, permitting the valve to move to its closed position, thus rendering the heating unit inoperative. The operation of the shut-off valve 70 causes the pilot 90 to be extinguished. The thermocouple 94 then operates to close the safety cut-off valve 74 so that it becomes necessary to restart the heater in the normal manner after the heater has been serviced and the covers closed.

As a further measure of safety, with the illustrated construction, a spring plunger is provided in the form of a coiled compression spring 110 which is mounted concentrically with the contact pin 106 for engagement with the under side of the $CO^2$ extinguisher. The spring 110 is of sufficient strength to swing the $CO^2$ extinguisher and cover 33 outwardly on its hinge so that the heater will with certainty be shut-off in the event that the covers are not securely held in place by engagement of the latch member 40 and catch 42.

An alternative form of fuel safety shut-off is illustrated in somewhat diagrammatic form in Fig. 5 of the drawings. In this form of the device, the shut-off valve 70 is eliminated and a push button switch 112 is substituted therefor. The switch is connected in the return line from the thermocouple to the safety cut-off valve 74. In this form of the device, the closing of the cover 33 with the fire extinguisher 100 thereon has the effect of moving the extinguisher 100 against the push button switch 122, closing the circuit to the thermocouple. The burner can now be started in the usual manner by the operator who lights the pilot and holds the manual control provided with the safety shut-off valve 74 in open position until the thermocouple has sufficiently warmed to maintain the valve in its open position. Removal of the cover 33 and fire extinguisher 100 therewith will cause the push-button switch 112 to open, breaking the thermocouple circuit and causing the safety shut-off valve 74 to close. The heating unit is thus rendered inoperative.

A feature of each of the constructions thus provided, consists in the operation of the safety shut-off valve 74 with either construction. Removal of the cover 33 has the effect of shutting off this valve, so that the supply line to the burner will not be again opened when the cover is replaced, or until the operator has gone through the required motions of resetting the safety shut-off valve 74 and lighting the burner.

The invention having been described, what is claimed is:

1. A portable gas burning space heating unit, which comprises a metallic housing providing a fuel storage chamber, a stack supported at one side of the fuel storage chamber and separated therefrom, a burner in the stack, means for supplying a liquefied petroleum gas to the burner including a container in the storage chamber, a removable cover providing access to the chamber, yieldable means tending to displace said cover, means rendered operative by the displacement of the cover to extinguish the burner, and manually operable locking means for locking the cover in its closed position.

2. A portable gas burning space heating unit, which comprises a metallic housing providing a fuel storage chamber, a stack supported at one side of the fuel storage chamber and separated therefrom, a burner in the stack, means forming air intake connection to the burner from adjacent the floor level and from said chamber, means for supplying a liquefied petroleum gas to the burner including a container in the storage chamber, and a pair of removable covers disposed when in closed position at right angles to one another and hinged to the housing along the remote edges thereof, yieldable means acting on one of said covers to move the same to open position, and fastening means connecting together the adjacent edges of said covers in closed position.

3. A portable gas burning space heating unit which comprises a metallic housing providing a fuel storage chamber, a stack supported at one side of the fuel storage chamber and separated therefrom, a burner in the stack, means forming air intake connections to the burner from adjacent the floor level and from said chamber, means for supplying a liquified petroleum gas to the burner including a container in the storage chamber, and connections therefrom to the burner, and a yieldably seated normally closed shut-off valve in said connections, means for removably enclosing said chamber including a hinged cover, yieldable means tending to swing said cover to its open position, a connection rendered operable by movement of said cover to closed position to open said valve and by movement of said cover to the open position to shut off said valve, and locking means for the cover.

4. A portable gas burning space heating unit, which comprises a metallic housing providing a fuel storage chamber, a stack supported at one side of the fuel storage chamber and separated therefrom, a burner in the stack, means for supplying a liquefied petroleum gas to the burner including a container in the storage chamber, and connections therefrom to the burner including a shut-off valve, a valve actuator, means to provide access to said chamber including a displaceable cover, yieldable means acting on said cover to displace the same, a thermally controlled fire extinguishing unit, means for supporting said unit on the cover in such relation to said valve actuator for the closed position of the cover to engage said actuator to open the valve, and rendered operative by displacement of the cover to be disengaged from said actuator to permit the shutting off of said valve, and means for locking the cover in its closed position.

5. A portable gas burning space heating unit, which comprises a metallic housing providing a fuel storage chamber, a stack supported at one side of the fuel storage chamber, a burner in the stack, a pilot associated therewith, means for supplying a liquefied petroleum gas to the burner including a container in the storage chamber, and supply connections from the container to the burner, means for extinguishing the burner including a safety shut-off valve in said connections, a thermocouple in circuit with the valve rendered operative by the extinguishing of the pilot to close said valve, a push-button switch in said thermocouple circuit, means to provide access to said fuel storage chamber including a displaceable cover, a switch actuator supported on said cover in such relation to the push-button switch for the closed position of the cover to close the switch and rendered operative by displacement of the cover to permit the switch to open, and means for locking the cover in its closed position.

6. A portable gas burning space heating unit which comprises a base, a burner for a liquefied petroleum gas having a large capacity of the order of 20,000 to 200,000 B. t. u. per hour, a metallic air circulating stack within which the burner is mounted, said stack opening at its upper end within the space to be heated, being supported from the base, and having an air inlet port below the burner lever, and an auxiliary air inlet port above the burner level, a baffle at the top of the stack, means for supplying gas to the burner comprising a liquefied gas container, and a supply connection from the container to the burner, means for supporting the container at one side of the stack adjacent thereto to be heated from the stack, and means to control the supply of fuel to the burner including a thermostat disposed externally of the heating unit and spaced from the stack in position to be responsive to increases of air temperature of the space to be heated and to the radiant heat from said stack to reduce the fuel supply.

7. A portable gas burning space heating unit which comprises a base, a metallic air circulating stack opening at its upper end within the space to be heated and supported from the base, a burner for a liquefied petroleum gas having a large capacity of the order of 20,000 to 200,000 B. t. u. per hour carried in the stack, an inlet port to the stack beneath the burner, an auxiliary air supply duct having an opening to the space to be heated adjacent the floor level and providing an air inlet port into the stack above the burner, means for supplying gas to the burner comprising a liquefied gas container, and a supply connection from the container to the burner, means for supporting the container at one side of the burner adjacent the stack, partitioning means constructed and arranged to control the dissemination of heat from the burner to the container to maintain the temperature range within the container at approximately 85° to 100° Fahrenheit, and means to control the supply of fuel to the burner including a thermostat located externally of the heating unit and adjacent the stack in position to be actuated by radiant heat given off by the stack in the event that the stack is overheated to reduce the fuel supply.

8. A portable gas burning space heating unit which comprises a base, a housing on the base providing a fuel storage chamber, an air circulating stack opening at its upper end within the space to be heated supported at one side of the housing on the base and separated from the adjacent wall of the housing to provide an intervening air space to control the transfer of heat from the stack to the chamber, a burner in the stack at substantially the same level as the lower portion of the chamber, an air inlet port to the stack below the burner, an auxiliary air supply duct having an opening at its lower end to the space to be heated and at its upper end providing an air inlet port into the stack above the burner, and means for supplying a liquefied petroleum gas to the burner including a fuel container in the storage chamber and a supply connection therefrom to the burner.

9. A portable gas burning space heating unit which comprises a hollow base, a metallic housing on the base providing an enclosed fuel storage chamber, said hollow base providing an enclosed base chamber beneath the fuel storage chamber, an air circulating stack opening at its upper end within the space to be heated at one side of the fuel storage chamber and separated therefrom by the respective adjacent walls of the stack and storage chamber and an intervening air space, a burner in the stack at substantially the same level as the bottom of the fuel storage chamber, said stack having an air inlet port below the burner from the base chamber, ports connecting the base chamber with the storage chamber, ports connecting the storage chamber with the space to be heated, an auxiliary air inlet port into the stack above the burner, and means for supplying a liquefied petroleum gas to the burner including a container in the storage chamber, and a supply connection from the container to the burner.

10. A portable gas burning space heating unit, which comprises a base providing a closed base chamber, a housing on the base providing a fuel storage chamber arranged to receive a container for a liquefied petroleum gas, said storage chamber having air vents connecting with the space to be heated and with said base chamber, an air circulating stack opening at its upper end within the space to be heated separated from the housing by an air space, a burner in the stack, means to supply gas from the container to the burner, an air intake port connecting the stack with the base chamber below the burner, and an auxiliary air intake duct having its intake opening adjacent floor level and at its upper end providing an air inlet port into the stack above the burner.

11. A portable gas burning space heating unit which comprises a base providing a closed base chamber, a metallic housing on the base providing a fuel storage chamber, an air circulating stack opening at its upper end within the space to be heated supported at one side of the fuel storage chamber housing on the base, and separated therefrom, a burner in the stack, ports connecting the base chamber with the stack below the burner and with the fuel storage chamber, ports connecting the fuel storage chamber with the space to be heated, a thermally controlled fire extinguishing unit in the fuel storage chamber, means for supplying liquefied petroleum gas to the burner including a fuel container in the storage chamber, and a supply connection therefrom to the burner, a control valve to control the supply of fuel to the burner, and a thermostat connected to control said valve located externally of the heating unit and adjacent the stack in position to be acted upon by radiant heat from the stack caused by overheating to reduce the supply of fuel to the burner, the separation of the chamber housing from the stack and the location of the thermostat being such as to maintain a controlled temperature of said fuel container within a reasonable range of maximum efficiency for the evaporation of gas therefrom.

12. A portable gas burning air circulating type space heating unit, which comprises a metallic housing providing a fuel storage chamber arranged to support a container for a liquefied petroleum gas within the chamber, an air circulating stack opening at its upper end within the space to be heated located adjacent said housing and separated therefrom by a heat insulating space, a burner in the stack at substantially the same level at which the container is supported, an inlet port to the stack below the burner level, and means forming an enclosed chamber through which air is drawn to said port from the storage chamber, means for supplying gas from the container to the burner, a thermostat disposed externally of the heating unit and spaced from the stack at substantially the same level with the burner adjacent the stack whereby the thermostat is affected by the temperature of the space to be heated and by radiant heat from the stack in the event of overheating of the stack, and connections from the thermostat rendered operative by overheating of the stack to reduce the supply of gas to the burner, the separation of the chamber housing from the stack and the location of the thermostat being such as to maintain a controlled temperature of said fuel container within a reasonable range of maximum efficiency for the evaporation of gas therefrom.

13. A portable gas burning space heating unit which comprises a metallic housing including a base, a fuel storage chamber on the base, an air circulating stack opening at its upper end within the space to be heated supported from the base at one side of the storage chamber and separated therefrom by the walls of the stack and storage chamber and an intervening air space, said stack having the surfaces thereof treated to reduce the dissemination of radiant heat, and said chamber having the interior walls thereof treated to produce heat reflecting surfaces, a burner for a liquefied petroleum gas in the stack, an inlet port to the stack below the burner and means forming an enclosed chamber through which air is drawn to said inlet port from the storage chamber, means in the chamber for supporting a liquefied gas fuel container with the bottom portion thereof at substantially the same level as the burner, means to supply gas from the container to the burner, and means for controlling said supply of gas to the burner including a thermostat located externally of the unit and adjacent to the stack to be acted upon by radiant heat therefrom in the event of overheating of the stack to reduce the supply of gas to the burner, the width of said air space and the arrangement of the thermostat being such as to maintain a controlled temperature of said fuel container within a reasonable range of maximum efficiency for the evaporation of gas therefrom.

14. A portable gas burning space heating unit which comprises a base providing an enclosed base chamber, a metallic housing on the base providing a fuel storage chamber, an air circulating stack opening at its upper end within the space to be heated embodying a combustion chamber disposed at one side of and separated from said storage chamber to provide an air space therebetween, said stack having an air intake port from the base chamber below the combustion chamber, ports connecting the base chamber with the storage chamber, ports connecting the storage chamber with the space to be heated, and an auxiliary air intake duct opening downwardly into the space to be heated and connecting with the stack above the combustion chamber, a burner for liquefied petroleum chamber with a large capacity of between 25,000 and 75,000 B. t. u. per hour in the stack, a plurality of fuel containers mounted in the storage chamber with the bottom portions thereof at substantially the same level as the burner and a supply connection for supplying gas from the container to the burner, said stack having the surfaces thereof treated to reduce the dissemination of radiant heat, and said chamber having the interior walls thereof treated to produce heat reflecting surfaces, and means for controlling the supply of gas to the burner including a thermostat located externally of the unit and adjacent to the stack whereby the thermostat is affected by the temperature of the space to be heated and by radiant heat from the stack in the event of overheating of the stack to reduce the supply of gas to the burner.

ERIC MARTIN ANDERSON.
GEORGE R. KELLEY.
EARLE A. CLIFFORD.

REFERENCES CITED

The following references are of record in the file of this patent:

UNITED STATES PATENTS

| Number | Name | Date |
|---|---|---|
| 1,164,058 | Bayne | Dec. 14, 1915 |
| 1,200,613 | Honn | Oct. 10, 1916 |
| 1,900,520 | Pickup | Mar. 7, 1933 |
| 2,226,210 | Silva | Dec. 24, 1940 |
| 2,303,807 | Wilson | Dec. 1, 1942 |
| 2,317,836 | Weaver | Apr. 27, 1943 |
| 2,350,860 | Anderson | June 6, 1944 |
| 2,357,575 | Benz | Sept. 5, 1944 |
| 2,363,168 | Findley | Nov. 21, 1944 |
| 2,377,901 | Reeves | June 12, 1945 |
| 2,396,657 | Holthouse | Mar. 19, 1946 |